US007096992B2

(12) United States Patent
Rogg et al.

(10) Patent No.: US 7,096,992 B2
(45) Date of Patent: Aug. 29, 2006

(54) POLE FOR HAND PALLET TRUCK

(75) Inventors: Andreas Rogg, Lübeck (DE); Michael Niebuhr, Bargteheide (DE)

(73) Assignee: Jungheinrich Aktiengesellschaft, (DE)

( * ) Notice: Subject to any disclaimer, the term of this patent is extended or adjusted under 35 U.S.C. 154(b) by 451 days.

(21) Appl. No.: 10/716,244

(22) Filed: Nov. 18, 2003

(65) Prior Publication Data
US 2004/0099086 A1 May 27, 2004

(30) Foreign Application Priority Data
Nov. 20, 2002 (DE) ............................... 102 54 030

(51) Int. Cl.
B62D 1/14 (2006.01)
(52) U.S. Cl. ........................................ 180/332; 74/488
(58) Field of Classification Search ................ 180/315, 180/332, 19.1; 74/488, 501.6, 502.2, 519, 74/523, 543–551.9
See application file for complete search history.

(56) References Cited

U.S. PATENT DOCUMENTS

| 3,411,170 | A | * | 11/1968 | Kingsley | ..................... | 15/50.1 |
| 4,198,721 | A | * | 4/1980 | Copeland | ..................... | 15/50.1 |
| 4,223,901 | A | * | 9/1980 | Klemick | ..................... | 280/43.12 |
| 4,589,669 | A | * | 5/1986 | Kedem | ..................... | 280/43.12 |
| 4,900,881 | A | * | 2/1990 | Fischer | ..................... | 200/61.85 |
| 5,595,259 | A | * | 1/1997 | Gilliland et al. | ............ | 180/332 |
| 5,953,781 | A | * | 9/1999 | Sletten et al. | ................ | 15/50.3 |
| 2003/0132043 | A1 | * | 7/2003 | Lin | ........................... | 180/65.2 |
| 2004/0251073 | A1 | * | 12/2004 | Gerbier et al. | ............. | 180/333 |
| 2006/0048979 | A1 | * | 3/2006 | Johansson et al. | ......... | 180/19.1 |

FOREIGN PATENT DOCUMENTS

DE 297 10 503 9/1997
EP 1 186 511 3/2002

* cited by examiner

Primary Examiner—David R. Dunn
Assistant Examiner—L McCreary, Jr.
(74) Attorney, Agent, or Firm—Peter J. Bilinski

(57) ABSTRACT

A pole for a hand pallet truck includes a pole bar linked to a support for a steerable wheel at its lower end and connected to a loop-shaped handle at a remaining end. The handle is centrally grappable at its near end and includes an operating device therein attached to a holding extension projecting into the handle. The holding extension is connectable to a lifting apparatus of the hand pallet truck via a traction and/or pushing element with operating levers being disposed on either side thereof The operating levers are pivotally mounted on the holding extension in a plane defined by the handle, each operating lever acting on a common displacement element connected to the traction or pushing element wherein pulling the operation levers from a neutral position away from the pole bar causes a lowering operating and pushing the operating lever's out of the neutral position towards the pole bar allows a lifting operation of the lifting apparatus. Preferably, the operating levers are coupled such that the lowering operation and lifting operation can be effected by pulling one single lever or both levers simultaneously.

11 Claims, 4 Drawing Sheets

POLE FOR HAND PALLET TRUCK

FIELD OF THE INVENTION

This invention relates to a hand pallet truck.

BACKGROUND OF THE INVENTION

In conventional hand pallet trucks, the pole is used to steer and move the vehicle, as well as to pump for lifting a load. To operate the lifting apparatus, especially to lower the load, an operating element is required which should be easily accessible, and allow switching between the functions of lifting and driving as well as sensitive lowering of the load.

Easy accessibility of the operating element is especially important for effective operation of the hand pallet truck when pulling the vehicle, i. e. when the pole is an inclined position in front of the vehicle. By contrast, actuating the functions with upright pole, i. e. when the vehicle is being pushed, is less important, because in most cases the vehicle is drawn out of the pallet, thereby returning the pole into the inclined position.

For pumping and moving the vehicle, it is of advantage if the pole handle is centrally grippable in order to avoid unnecessary steering as well as frictional forces. At the same time, the actuating forces at the operating element should be as small as possible in all situations requiring a longer actuating path, which might be realized by providing a longer distance between the circle point and the lever pivot point, for example.

It is known to use an extension of the pole bar traversing the handle as a mounting component for an operating lever extending to the sides. This known pole handle has the drawback that it cannot be gripped centrally. From DE 297 10 503 U1 it is further known to pivotally mount a control lever at the upper end of the portion of the bar extending into the handle. The lever must be pushed away from the operator to achieve a lowering of the load. Pulling the lever towards the operator will result in a switch to the lifting function. A drawback of this design is that the operator cannot actuate the functions well while pulling the vehicle because the control lever has to be pulled upwards to achieve a lowering action. Further, since the operating element is not familiar from other technical devices, it is less suitable for intuitive operation. The actuating forces are great due to the small distance between the circle point and the lever pivot point.

It is an object of the invention to provide a pole for a hand pallet truck which allows central gripping of the pole bar while keeping the actuating forces as low as possible, and which may be operated intuitively.

SUMMARY OF THE INVENTION

A pole according to the invention has an operating lever on either side of the holding extension. The operating levers are pivotal in a plane defined by the handle. Thereby the levers are protected from involuntary actuation by the loop-shaped handle.

The operating levers act together on a shifting element which is connected to a traction element or a pushing element. The traction element may be a rope. The pushing element may be constituted by a rod. The traction or pushing element is usually accommodated in the hollow pole bar and is connected to a functional unit in the pallet truck in order to carry out the lowering operation and to set the lifting function. The shifting element is actuated by the operating levers by the intermediate action of a coupling mechanism.

The functioning of the operating levers is such that the lowering operation is caused by pulling the operating levers away from a neutral position. Pushing the levers in the direction of the pole bar, i. e. towards the pole bar away from the neutral position, causes the lifting operating to be switched on. The coupling mechanism is designed such that the lowering operation is triggered by pulling either one single operating lever, or both operating levers simultaneously. By contrast, the lifting operation is switched on by pushing one single lever or both operating levers.

The pole according to the invention allows actuation of the lifting and lowering functions with only one hand as well as with both hands, while the actuating direction is adapted to be intuitive to the handling of the pallet truck.

Actuating the lowering function not only triggers the lowering operation, but the extent of actuation also determines the lowering speed. Since the lowering operation is also effected by pulling on both operating levers, as mentioned above, one embodiment of the invention provides that the operating lever pulled furthest determines the lowering speed. It follows that pulling one operating lever is independent of pulling the other. For example, one operating lever may stay in the neutral position while the other one is being pulled.

When initiating the lifting operation, which is effected by pumping with the pole, the operating levers are actuated either singly or together by pushing them away from the operator towards the pole bar. The two operating levers are preferably coupled to each other, so when actuating one operating lever, the other one is pivoted with it. This allows the operator to recognize clearly which function is switched on at any time.

It may happen that, due to incorrect operation, one lever is being pulled and the other lever is being pushed. In this case, the invention provides for that function being actuated for which the greatest force is being exerted. If for example one of the operating levers is pushed more strongly than the other one is being pulled, the lifting function will be actuated. If the situation is reversed, the lowering function is started.

Several constructive alternatives are conceivable to implement the coupling mechanism. According to the invention, one possibility is to mount the shifting element which is coupled to the traction or pushing element, in a linearly movable way and to provide the shifting element with a toothed rack portion having a toothing on opposing sides. The operating levers each have a toothed portion cooperating with one toothing of the toothed rack portion. The teeth in the toothed portion of the lever on one hand and the teeth in the toothed rack on the other hand are formed such that the function described above is effected upon actuating the operating levers.

To keep the actuating forces as low as possible, a long lever path is of advantage. According to one embodiment of the invention, the inner end portions of the operating levers therefore cross each other in the region of the holding extension and the pivot point of each is positioned at the respective opposite side of the shifting element. In this way, the levers have maximum length thereby minimizing the actuating force.

According to a further embodiment of the invention, the extension has a housing made of two shells, and the dividing plane of the housing either coincides with or is parallel to the pivot plane of the operating levers, while the pivot points of the operating levers are situated inside the housing. The housing has slots on opposite sides, through which the operating levers project to the outside.

BRIEF DESCRIPTION OF THE DRAWING

These and other objects, features and advantages of this invention will be apparent from the following detailed description of the preferred embodiments and best mode, appended claims and accompanying drawings, in which:

DETAILED DESCRIPTION OF THE INVENTION

Figure 1:
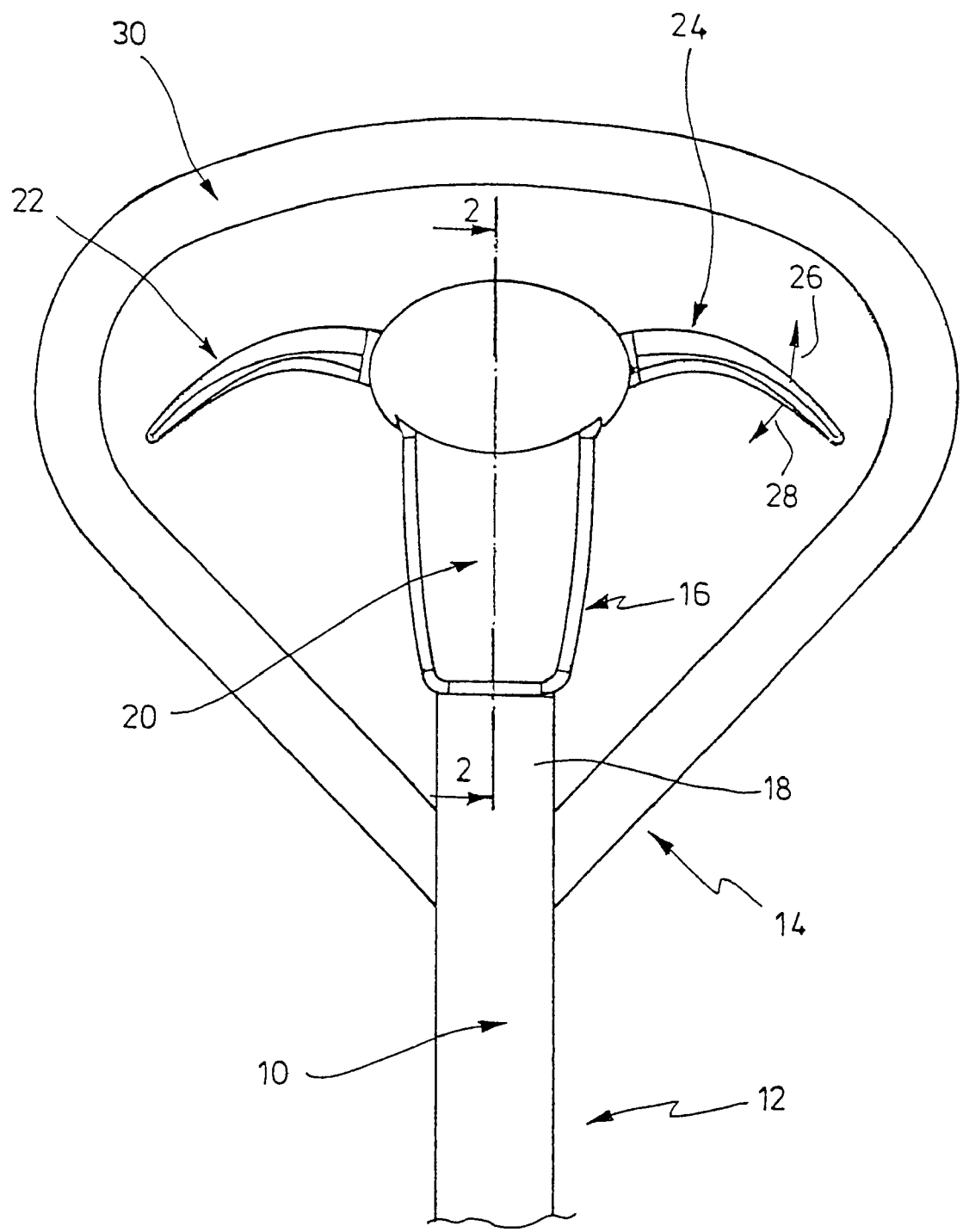
FIG. 1 is a top view of a part of the pole bar of a hand pallet truck and a handle connected to the pole bar.

FIG. 1 shows a bar 10 of a pole generally indicated at 12. Only the section 10 and a loop-shaped handle 14 of the pole are shown. The other end of the pole bar 10 is connected or linked to the pillow block of a steered wheel of a hand pallet truck (not shown) for the purpose of manipulating the hand pallet truck accordingly. As usual, the hand pallet truck includes a pump for lifting the load carrying means and a valve arrangement for lowering the load carrying means.

As usual, the handle 14 is formed by a suitably curved tube defining a plane in which is also disposed the axis of the bar 10. The bar 10 projects into the interior of the handle 14, thereby forming a holding extension 16. This holding extension comprises a tube section 18 and a housing 20 which have been mounted and fastened on the tube section 18. Details about this process will be described below.

In the housing, two operating levers 22, 24 are pivotally mounted for actuation of the lifting and lowering functions of the hand pallet truck (not shown). Details of these levers 22, 24 and their mountings are apparent from the further figures.

As shown by the arrows 26, 28, the levers may be pivoted in both directions in a plane coinciding with or parellel to the plane of the handle 14. Attention is drawn to the fact that the distance between the housing 20 or the extension 16 and the rear portion 30 of the handle 14 is such that the rear portion of the handle 14 may be gripped by hand in any position.

Figure 2:
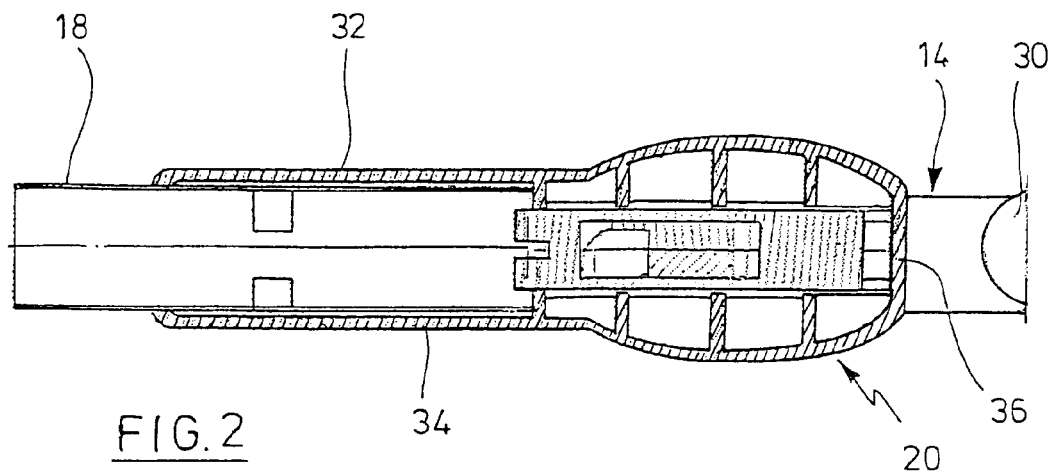
FIG. 2 is a cross-sectional view of the device of FIG. 1 taken along line 2—2.

As shown in FIG. 2, the housing 20 consists of an upper shell 32 and a lower shell 34, the dividing plane 36 of the two shells being disposed in the central plane of the handle 14. The left part of the housing 20 is formed by a socket portion receiving the tube section 18 in order to attach the housing 20.

Figure 3:
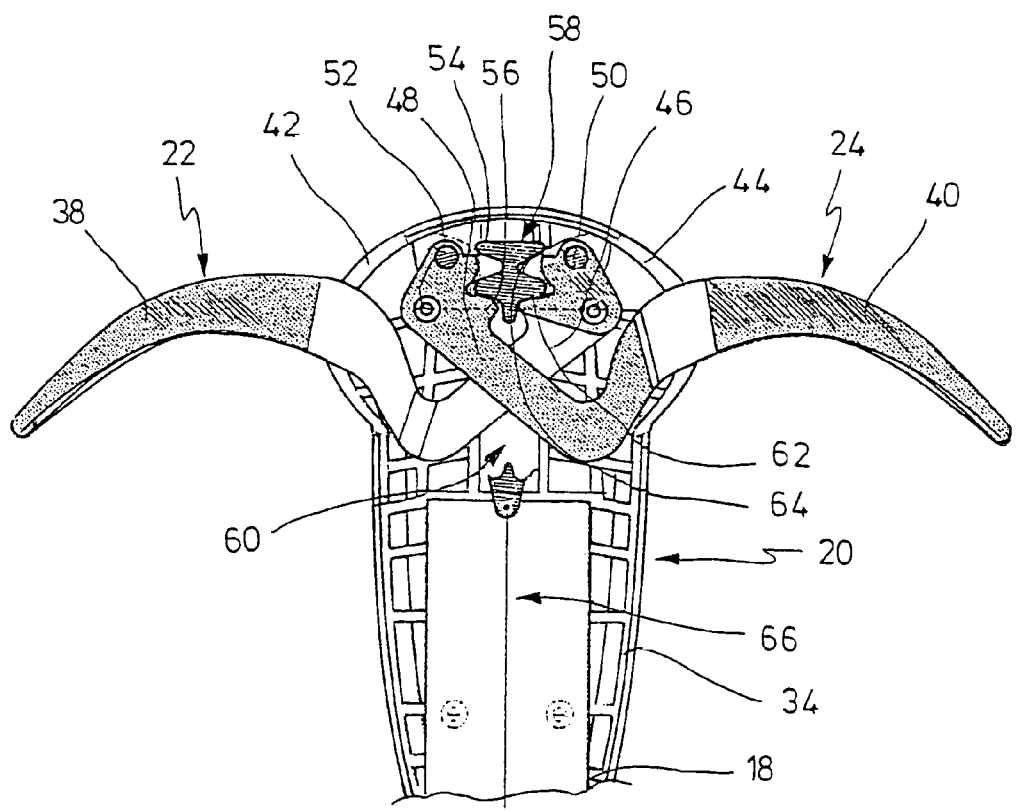
FIG. 3 is a cross-sectional view of the holding extension and the operating levers of the handle of FIG. 1 in a first operating position.

As is apparent from FIG. 3 and the following figures, the two operating levers 22, 24 have the same slight S-form. The curved actuating portions 38, 40 of the operating levers 22, 24 project through side slots 42, 44 in the housing 20 towards the outside. The curvature of portions 38, 30 is such that the convex sides face the operator and the concave sides face the pole bar, as is readily apparent from the drawings. The inner portions 36, 48 of the operating levers 22, 24 are curved in opposite directions and are pivotally mounted at pivot points 50, 52 in the housing 20, respectively. Mounting is effected for example by means of a bearing journal extending through a hole in either portion 46, 48. The holes are disposed nearly at the end of portions 46, 48.

The operating levers 22, 24 shown in FIG. 3 in the neutral position may be pivoted upwards as well as downwards in FIG. 3. A stop to the pivotal movement is provided but not shown in detail.

As is apparent from FIG. 3 and the further figures, each lever portion 46, 48 has a toothed portion having two teeth 54, 56. The toothed portions of the two lever portion 46, 48 cooperate with a toothed rack 58 attached to a shifting element 60 which is mounted such that it is linearly movable in the axis of bar 10 in the housing 20. The toothed rack portion 58 includes two teeth 62, 64 on each of its opposing sides, which cooperate with the corresponding teeth 54, 56 of lever portions 46, 48, respectively.

A traction rope 66 is attached to the opposite end of the shifting element 60, the traction rope being in turn connected to corresponding control devices in the hand pallet truck.

Figure 4:
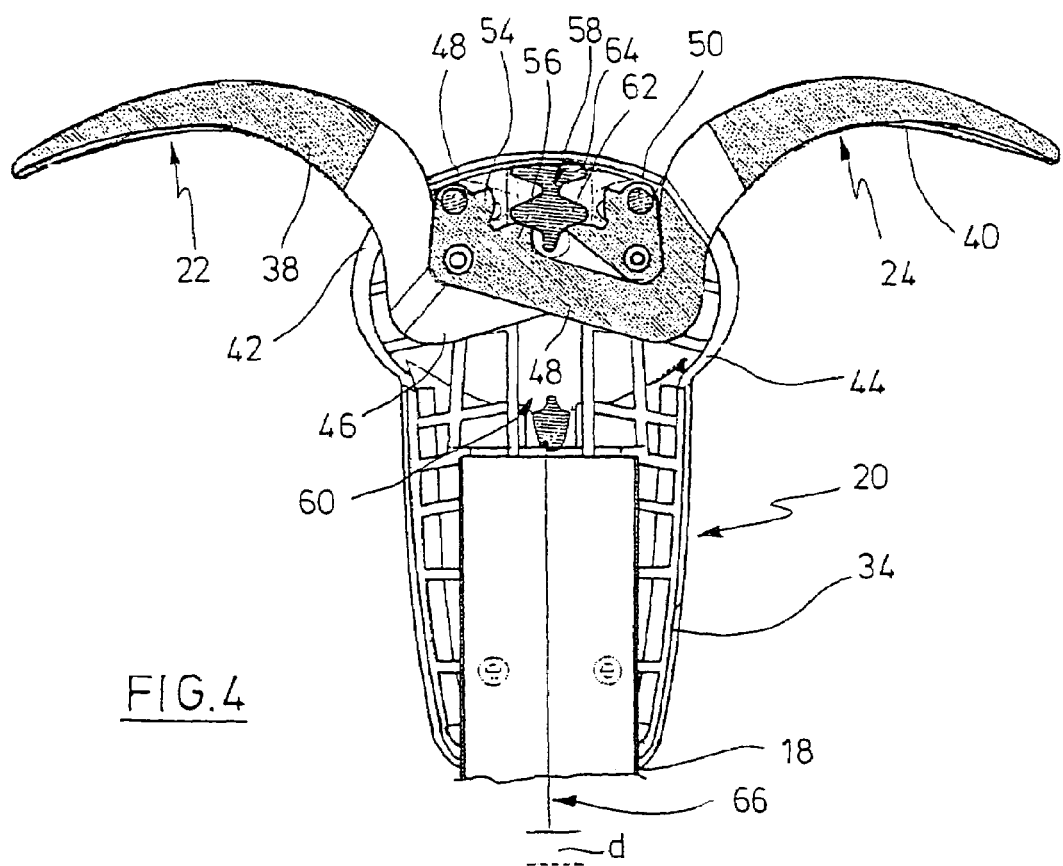
FIG. 4 is a view similar to FIG. 3, but with pulled operating levers.
Figure 5:
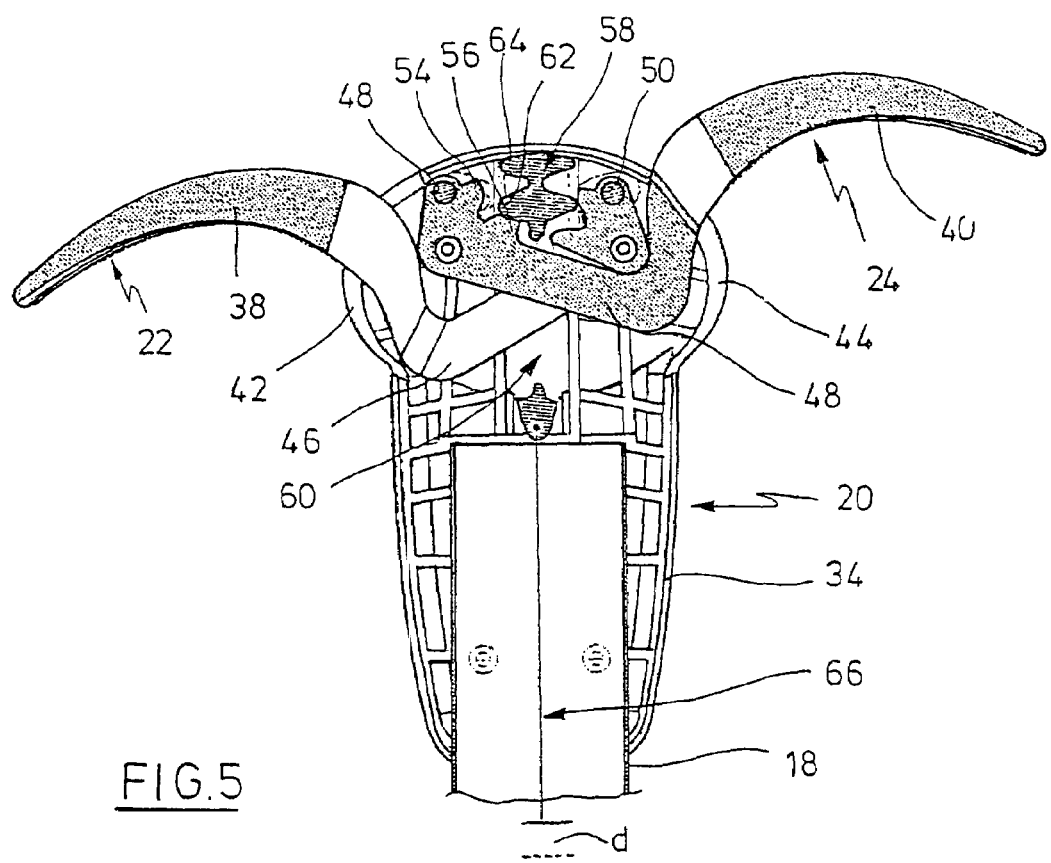
FIG. 5 is a view similar to FIG. 3 or 4, wherein one operating lever is being pulled and the other one is in neutral position.
Figure 6:
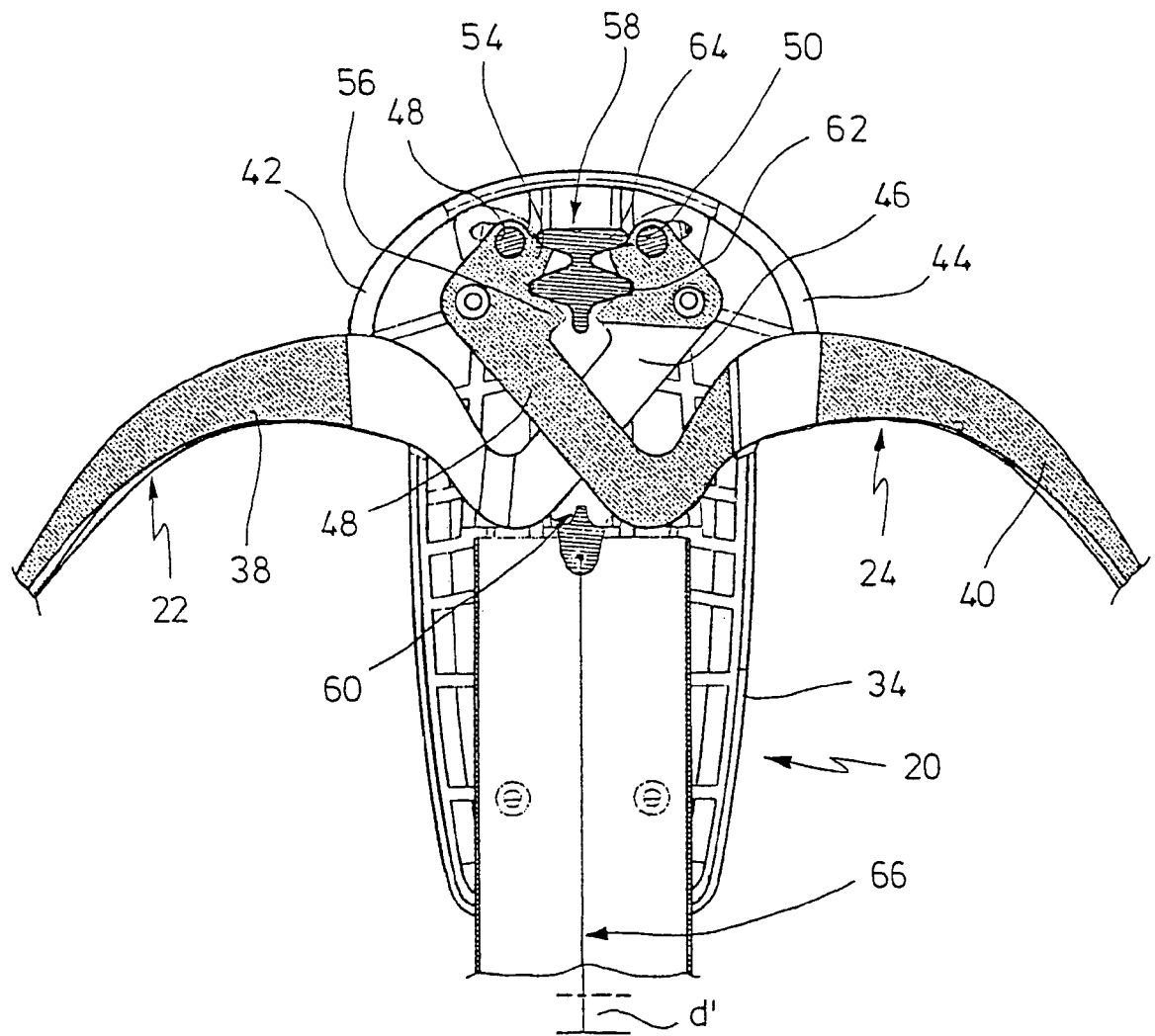
FIG. 6 is a view similar to FIGS. 3 and 4, wherein both operating levers are in the pushed position.

Referring to FIGS. 4 to 6, the function of the lever mechanism for actuating the traction rope 66 shown in the figures will now be explained.

If a lever is pivoted in the direction of arrow 26, i. e. towards the operator or handle portion 30, as shown in FIG. 4, the toothed rack portion 58 will be displaced by tooth 56 in the direction of the operator. This causes rope 66 to perform a traction movement, the displacement being indicated by the distance d between the broken and full lines in FIG. 4. The broken line indicates the neutral position as shown in FIG. 3. It is apparent that the same operation is achieved when both levers 22, 24 are pulled. If one lever is pulled further than the other, the displacement of the lever pulled furthest is decisive. The extent of deflection of the traction element 66 determines the lowering speed of the load carrying means of the hand pallet truck (not shown).

If the pulled lever is released, it returns to the neutral position according to FIG. 3 by means of a suitable restoring device. For this purpose, spring means may be provided in suitable positions. It is also conceivable to lock the levers 22, 24 lightly in the neutral position in order to prevent a slight touch from triggering a function.

As shown in FIG. 5, the lever 22 remains in its neutral position when the lever 24 is being pivoted for the purpose of triggering a lowering function. With respect to the lowering function, the operating levers 22, 24 are independent.

If a lever 22 or 24 is being pushed, i.e. pivoted away from the operating person, as shown in FIG. 6, the shifting element 60 will be pushed in the same direction. This initiates a lifting function. The displacement of rope 66 relative to the neutral position is indicated at d'. Now lifting of the load carrying means may be effected by "pumping" with the pole bar 10.

Teeth 56, 56 engage the toothing of toothed rack portion 58 such that a displacement of the toothed rack portion 58 caused by an actuation of one lever leads to pivoting of the other lever as well. Actuating one operating lever 22, 24 in the direction away from the operator therefore leads to synchronous displacement of both levers. Hence, it would also be possible to actuate both levers. Due to this synchronous displacement, the operator may recognize the operating position of the actuating device.

It may happen that one operating lever is being pulled and the other one is being pushed. As is apparent from the drawings, this will activate the function corresponding to the lever on which the greatest force is exerted.

However, if one lever 24 is being pulled, as shown in FIG. 5, pushing the other lever 22 is not possible because, as is apparent from FIGS. 4 and 5, this lever 22 will be blocked by lever 24 through an interlocking of teeth.

We claim:

1. A pole for a hand pallet truck comprising:
   a pole bar linked to a support for a steerable wheel at its lower end and connected to a loop-shaped handle at the other end, the handle being centrally grippable at its rear end,
   an operating device within the handle, the operating device being attached to a holding extension projecting into the handle in prolongation of the bar, and being connectable to a lifting apparatus of the hand pallet truck via a traction and/or pushing element,
   wherein an operating lever (22, 24) is disposed on either side of the extension (16), the operating levers being pivotally mounted on the holding extension (16) in a plane defined by the handle (14), in that both operating levers (22, 24) act on a common displacement element (60) connected to the traction or pushing element (66) such that pulling the operating levers (22, 24) out of a neutral position away from the pole bar (10) causes a lowering operation and pushing the operating levers out of the neutral position towards the pole bar (10) allows a lifting operation of the lifting apparatus, and in that the operating levers (22, 24) are coupled by means of a coupling mechanism such that the lowering operation is effected by pulling either one single operating lever (22, 24) or both operating levers (22, 24) at the same time, and the lifting operation is effected by pushing either one single operating lever (22, 24) or both operating levers (22, 24).

2. The pole of claim 1, wherein the extent of pivotal movement of the operating levers (22, 24) determines the speed of the lowering operation and the coupling mechanism is designed such that the operating lever (22, 24) pulled furthest determines the lowering speed.

3. The pole of claim 1, wherein the coupling mechanism is designed such that one operating lever (22, 24) remains in the neutral position if the other one is being pulled.

4. The pole of claim 1, wherein the coupling mechanism is designed such that, when displacing the operating levers in pushing direction and back to the neutral position, both operating levers (22, 24) are moved synchronously, even if only one lever is being actuated.

5. The pole of claim 1, wherein the coupling mechanism is designed such that, when the operating levers (22, 24) are actuated in opposite directions, the operation triggered corresponds to the operating lever on which the greater force is exerted.

6. The pole of claim 1, wherein the displacement element (60) is linearly movable and has a toothed rack portion (58) including a toothing (64, 62) on opposing sides and the operating levers (22, 24) each have a toothed portion cooperating with one toothing of the toothed rack portion (58).

7. The pole of claim 6, wherein inner end portions (46, 48) of the operating levers (22, 24) cross each other in a region of the holding extension (16) and pivot points (48, 50) of the levers are disposed on the respective opposite sides of the displacement element (60).

8. The pole of claim 1, wherein the holding extension (60) has a housing (20) formed by two shells (32, 34), a dividing plane of the housing being disposed in or parallel to the pivoting plane of operating levers (22, 24), wherein the operating levers (22, 24) and the displacement element (60) are mounted in the housing, the housing (20) having slots (42, 44) in the sides through which the operating levers (22, 24) project to the outside.

9. The pole of claim 8, wherein the housing shells (32, 34) have a socket portion receiving a tube portion (18) of the holding extension (16).

10. The pole of claim 1, wherein the coupling mechanism effects a restoration of the operating levers as soon as an actuating force acting on the respective operating lever lapses and also effects a locking in the neutral position or in the position of the lifting function.

11. The pole according to claim 1, wherein the holding extension and the pole bar are made in one piece.

* * * * *